(12) United States Patent
MacKenzie

(10) Patent No.: US 9,655,308 B2
(45) Date of Patent: May 23, 2017

(54) WALL PLANTING SYSTEM

(75) Inventor: David S. MacKenzie, Nunica, MI (US)

(73) Assignee: Hortech, Inc., Nunica, MI (US)

( * ) Notice: Subject to any disclaimer, the term of this patent is extended or adjusted under 35 U.S.C. 154(b) by 1264 days.

(21) Appl. No.: 12/831,732

(22) Filed: Jul. 7, 2010

(65) Prior Publication Data

US 2011/0192081 A1 Aug. 11, 2011

Related U.S. Application Data

(63) Continuation-in-part of application No. 12/700,786, filed on Feb. 5, 2010.

(51) Int. Cl.
*A01G 9/02* (2006.01)

(52) U.S. Cl.
CPC ............ *A01G 9/025* (2013.01); *Y02P 60/244* (2015.11)

(58) Field of Classification Search
USPC ....... 43/83, 79, 59 R, 62 R, 62 C, 39, 41.01, 43/82, 65.5, 65.9, 66.6
See application file for complete search history.

(56) References Cited

U.S. PATENT DOCUMENTS

| | | | |
|---|---|---|---|
| 2,279,735 A * | 4/1942 | Gates | 47/33 |
| 4,593,490 A * | 6/1986 | Bodine | 47/79 |
| 5,373,662 A | 12/1994 | Wickstrom | |
| 5,669,185 A * | 9/1997 | Proulx | 52/27 |
| 7,627,983 B1 | 12/2009 | Deutsch-Aboulmahassine | |
| 2008/0003445 A1 * | 1/2008 | Okuda et al. | 428/543 |
| 2009/0300984 A1 | 12/2009 | Gordon | |
| 2010/0095586 A1 * | 4/2010 | Sichello | 47/65.9 |
| 2011/0016784 A1 * | 1/2011 | Taber | 47/79 |
| 2011/0113685 A1 * | 5/2011 | Chang | 47/39 |

FOREIGN PATENT DOCUMENTS

| | | | |
|---|---|---|---|
| GB | 2239155 A * | 6/1991 | |
| JP | 2011083200 | 4/2011 | |
| KR | 100647211 | 11/2006 | |

OTHER PUBLICATIONS

International Search Report, Aug. 17, 2011, Korean Intellectual Property Office.

* cited by examiner

*Primary Examiner* — Kristen C Hayes
(74) *Attorney, Agent, or Firm* — Price Heneveld LLP

(57) ABSTRACT

A modular wall mounted agricultural system that includes a mounting structure having a first end, a second end, a fluid conduit extending longitudinally between the first end and the second end, and at least one longitudinally extending channel. The system further includes at least one planter box that is adapted to mount within the at least one channel of the mounting structure, and wherein the at least one planter box includes a plurality of sidewalls and a bottom wall that cooperate to form a compartment adapted to receive plant matter therein, the plurality of sidewalls cooperating to form an upwardly opening aperture adapted to receive a fluid from the conduit.

16 Claims, 4 Drawing Sheets

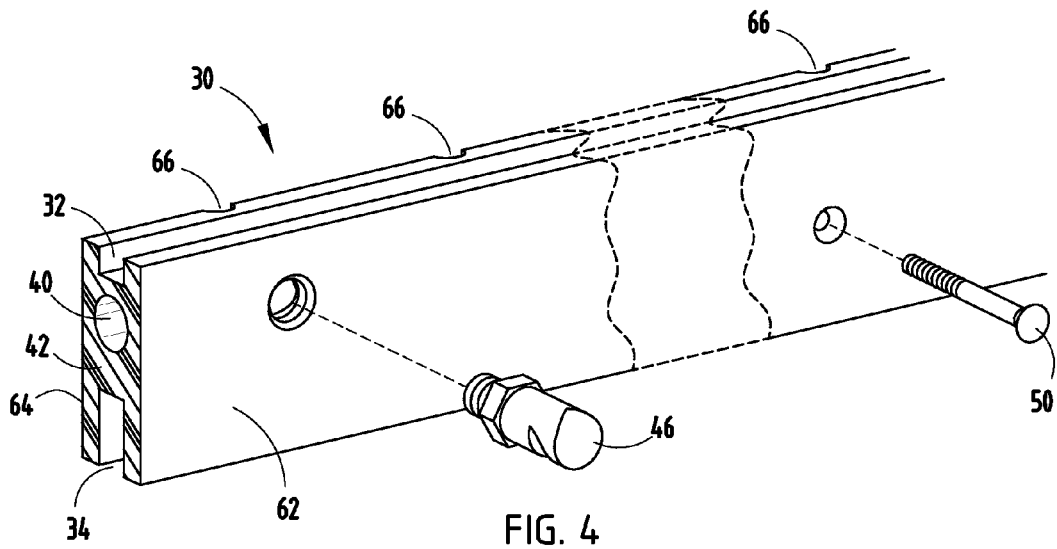
FIG. 4
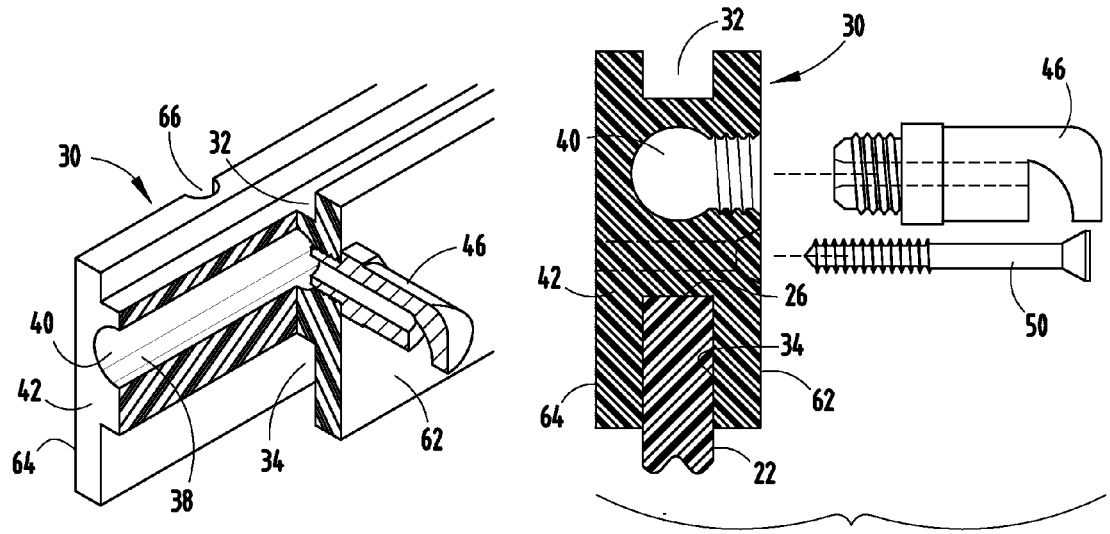
FIG. 5
FIG. 6
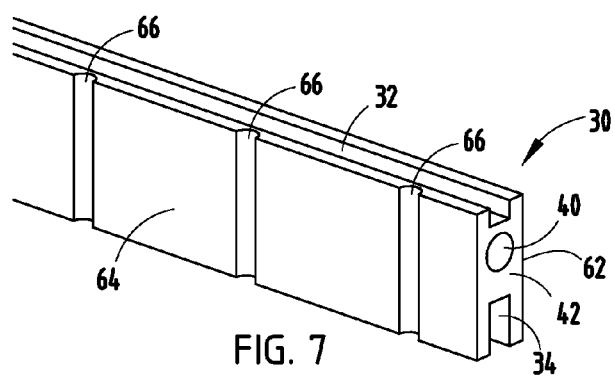
FIG. 7

WALL PLANTING SYSTEM

CROSS-REFERENCE TO RELATED APPLICATION

This application is a continuation-in-part of U.S. patent application Ser. No. 12/700,786 filed on Feb. 5, 2010, the entire disclosure of which is hereby incorporated herein by reference.

FIELD OF THE INVENTION

The present invention relates to a planting system, and in particular to a modular wall planting system that is adapted to secure to a vertical surface of a wall or a building structure.

SUMMARY OF THE INVENTION

One aspect of the present invention is a modular wall mounted agricultural system. The system includes a mounting structure having a first end, a second end, a fluid conduit extending longitudinally between the first end and the second end, and at least one longitudinally extending channel. The system further includes at least one planter box that is adapted to mount within the at least one channel of the mounting structure, and wherein the at least one planter box includes a plurality of sidewalls and a bottom wall that cooperate to form a compartment adapted to receive plant matter therein, the plurality of sidewalls cooperating to form an upwardly opening aperture adapted to receive a fluid from the conduit.

Another aspect of the present invention is to provide a planter unit for a modular wall planting system. The system includes a mounting structure adapted to mount to an outer surface of a substantially vertical wall structure, wherein the mounting structure comprises at least one outwardly opening, longitudinally extending channel. The system further includes at least one planter box comprising a plurality of sidewalls and a bottom wall that cooperate to form an upwardly opening compartment adapted to receive plant matter therein, and a rearwall extending outwardly from the compartment and engaged within the at least one channel.

Yet another aspect of the present invention is to provide a modular wall planting system. The system includes at least one mounting structure adapted to mount to an outer surface of a substantially vertical wall structure, wherein the mounting structure includes a longitudinally extending fluid conduit. The system further includes at least one planting unit engaged with and supported by the at least one mounting structure and configured so as to receive fluid from the fluid conduit.

These and other advantages of the invention will further be understood and appreciated by those skilled in the art by reference to the following written specification, claims and appended drawings.

BRIEF DESCRIPTION OF THE DRAWINGS

FIG. 4 is an exploded perspective view of a mounting structure of the modular wall mounted agricultural system;

FIG. 5 is a cross-sectional perspective view of the mounting structure;

FIG. 6 is a cross-sectional side view of the mounting structure; and

FIG. 7 is a rear perspective view of the mounting structure.

DETAILED DESCRIPTION OF THE PREFERRED EMBODIMENTS

Figure 1:
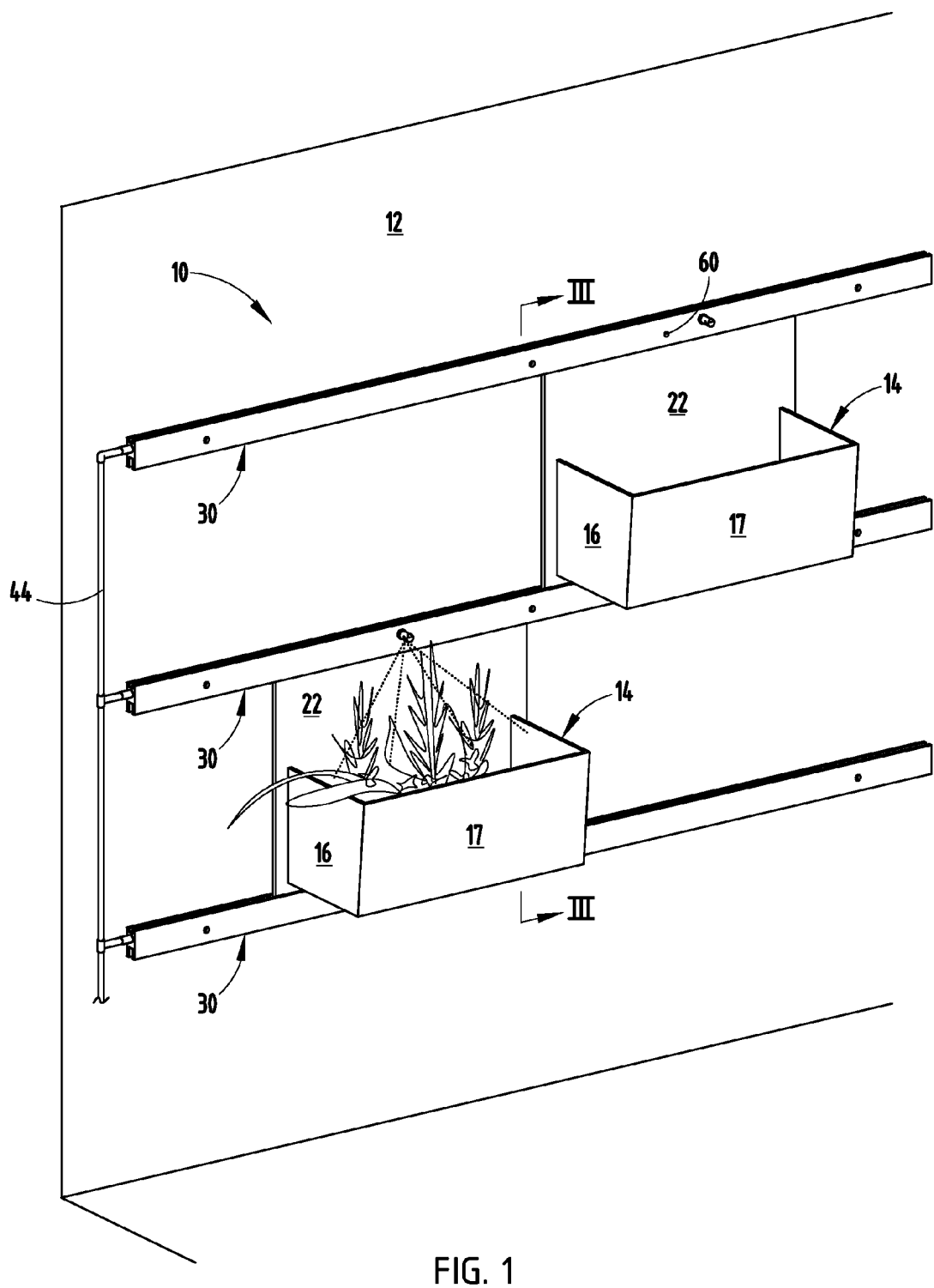
FIG. 1 is a perspective view of a vertical surface employing the modular wall mounted agricultural system embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a modular wall mounted agricultural system embodying the present invention. In the illustrated example, the modular wall mounted agricultural system 10 is employed on, and secured to, a vertical wall surface 12 of a building structure, although the wall mounted agricultural system 10 may be utilized in conjunction with both interior and exterior vertical and substantially vertical wall surfaces. The wall mounted agricultural system 10 comprises at least one planter box 14, but more likely a plurality of planter boxes 14, which cooperate to completely cover the vertical wall surface 12.

Figure 2:
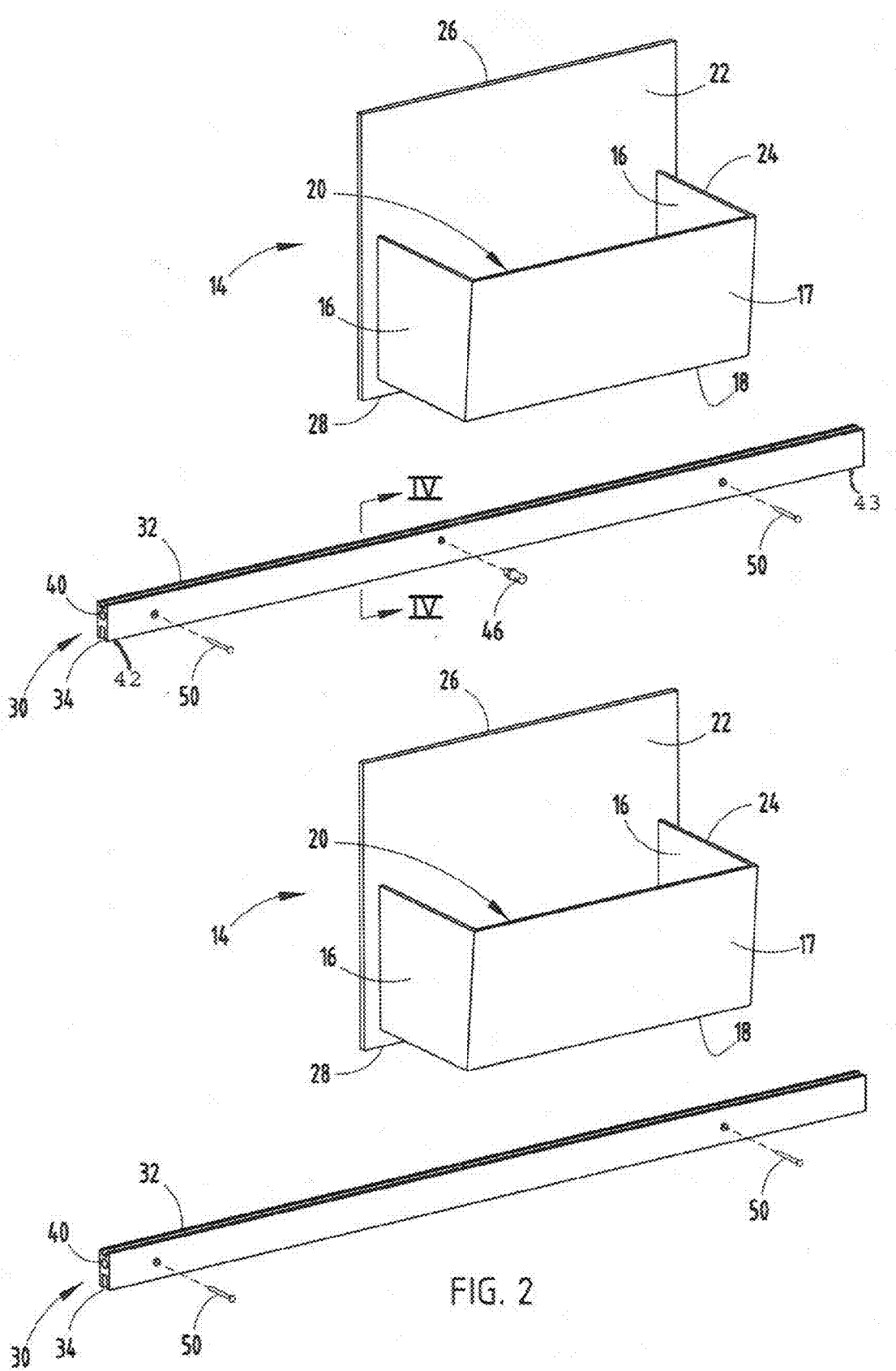
FIG. 2 is an exploded perspective view of the modular wall mounted agricultural system.
Figure 3:
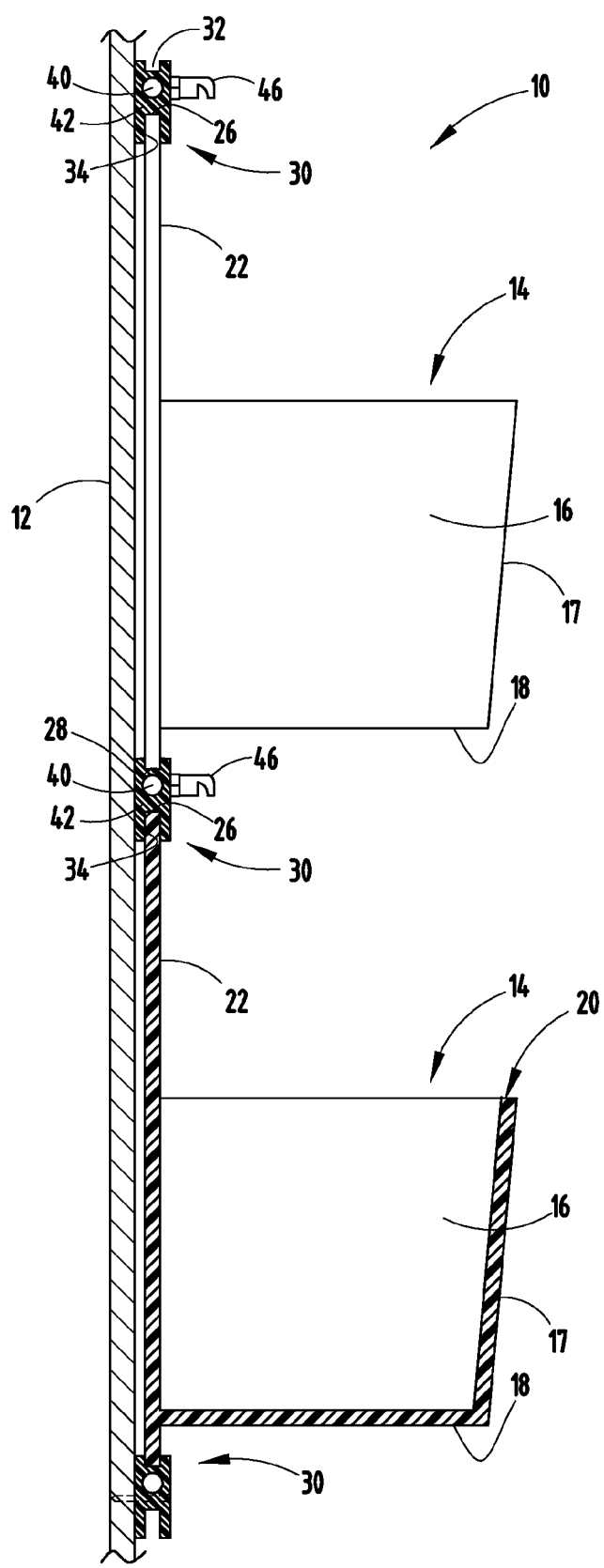
FIG. 3 is a cross-sectional side view of the modular wall mounted agricultural system.

As best illustrated in FIGS. 2 and 3, each planter box 14 includes a pair of sidewalls 16, a front wall 17, and a bottom wall 18 that cooperate to form an interior compartment 20. The interior compartment 20 is configured to receive plant matter therein, such as plantings and aggregate, e.g., dirt, soil, sand, and the like. The bottom wall 18 may include a plurality of apertures to provide drainage as needed.

Each planter box 14 includes a rearwall 22 that facilitates enclosing the interior compartment 20 and extends upwardly to a point above a top edge 24 of each sidewall 16 and also extends in a substantially downward direction to a point below the bottom wall 18. The wall mounted agricultural system 10 includes a plurality of mounting structures 30 that are adapted to receive the planter boxes 14 of the wall mounted agricultural system 10. Each mounting structure 30 is formed to have a substantially H-shaped cross-section along the entire length of the mounting structure 30. The H-shape of each mounting structure 30 forms an upper channel 32 and a lower channel 34 that each extend along the longitudinal direction of the mounting structure 30. The upper channel 32 is sized to receive a lower edge 28 of the rearwall 22 of the planter box 14. The lower channel 34 is sized to receive a top edge 26 of the rearwall 22 of the planter box 14. Therefore, two mounting structures 30 are typically employed to secure each planter box 14.

As seen in FIGS. 42-6, each mounting structure 30 includes a first end 42, a second end 43, and a conduit 38 that extends along the longitudinal direction of the mounting structure 30. In the illustrated example, an input aperture 40 is located at the first end 42 of the mounting structure 30. Additionally, an output aperture may be included at the second end 43. The input aperture 40 is sized and adapted so as to telescopingly mate with an input water line 44. Tapped into the conduit 38 is a water spraying device, such as a nozzle 46. The nozzle 46 is adapted to spray or mist water from the waterway 38 onto the plant matter residing in the planter box 14 immediately below the mounting structure 30. In assembly, the plurality of mounting structures 30 are secured to the wall surface 12 via a plurality of mechanical fasteners, such as screws 50. The mounting structures 30 are secured to the wall surface 12 in a vertically aligned manner and sufficiently spaced to accommodate planter boxes 14 therebetween. As described previously, the top edge 26 of each planter box 14 securely engages into the bottom channel 34 of a mounting structure 30 and the bottom edge 28 of the planter box 14 rearwall 22 securely engages the top channel 32 of a mounting structure 30. The input water line 44 brings water from a source and is passed through the input aperture 40 of each mounting structure 30. This allows water to be distributed to the plant matter within the planter boxes 14 as needed, via the nozzle 46.

To further secure the planter box 14 within each mounting structure 30, a screw or other suitable mechanical fastener 60 may be inserted through a front side 62 of the mounting structure 30 and further through the rearwall 22 of an attached planter box 14. As best illustrated in FIG. 7, a rear side 64 of the mounting structure 30 may include one or more canals 66, which facilitates the movement of excess moisture on the mounting structure 30.

In operation, water is supplied to each of the planter boxes 14 by supplying water to the water supply line 44 and in turn to each conduit 38. Water is then supplied from the conduits 38 into each planter box 14 via the nozzle 46. Access water within each planter box 14 may drain through optional apertures on the bottom wall 18 of each planter box 14.

The present inventive modular wall mounted agricultural system allows plant matter to be secured to vertical and substantially vertical surfaces of wall structures of free standing walls and buildings, thereby increasing the aesthetic appearance of the structure as well as improving the thermal efficiency of associated buildings. Further, the wall mounted agricultural system provides a durable outer surface to the structure to which it is attached, and includes a relatively uncomplicated design that may be installed and maintained by relatively unskilled personal. The present inventive planting system is efficient to use, capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A modular wall mounted agricultural system, comprising:
   a mounting structure comprising:
      a first end;
      a second end;
      a fluid conduit extending longitudinally between the first and the second end; and
      at least one longitudinally extending channel; and
   at least one planter box that is adapted to mount within the at least one channel of the mounting structure, and wherein the at least one planter box includes a plurality of sidewalls and a bottom wall that cooperate to form a compartment adapted to receive plant matter therein, the plurality of sidewalls cooperating to form an upwardly opening aperture adapted to receive a fluid from the conduit.

2. The modular wall mounted agricultural system of claim 1, wherein the at least one channel includes an upwardly opening first channel and a downwardly opening second channel, the at least one planter box includes a first planter box mounted within the first channel and a second planter box mounted within the second channel.

3. The modular wall mounted agricultural system of claim 2, wherein the mounting structure has a substantially H-shaped cross sectional configuration.

4. The modular wall mounted agricultural system of claim 1, wherein the mounting structure is mounted to the wall by at least one mechanical fastener.

5. The modular wall mounted agricultural system of claim 1, wherein the mounting structure further comprises a nozzle in fluid communication with the conduit, and wherein the nozzle is adapted to provide water to plant matter located within the at least one planter box.

6. The modular wall mounted agricultural system of claim 1, wherein the at least one planter box includes an outwardly extending substantially planar portion adapted to removably engage the at least one channel.

7. The modular wall mounted agricultural system of claim 6, wherein the planar portion of the at least one planter box is flexibly resilient.

8. The modular wall mounted agricultural system of claim 1, wherein the mounting structure further comprises a rear side and a front side, wherein the rear side includes a canal extending in a direction substantially perpendicular to the mounting structure longitudinal direction, and wherein a mechanical fastener protrudes through the front side of the mounting structure to further secure the planter box.

9. A planter unit for a modular wall planting system, comprising:
   a mounting structure adapted to mount to an outer surface of a substantially vertical wall structure, wherein the mounting structure comprises at least one outwardly opening, longitudinally and horizontally extending channel having a C-shaped cross-sectional configuration and includes a longitudinally extending fluid conduit, and a nozzle in fluid communication with the fluid conduit, wherein the nozzle is adapted to provide water to plant matter located within the at least one planter box; and
   at least one planter box comprising a plurality of sidewalls and a bottom wall that cooperate to form an upwardly opening compartment adapted to receive plant matter therein, and a rearwall extending outwardly from the compartment and engaged within the at least one channel.

10. A modular wall planting system, comprising:
   at least one mounting structure adapted to mount to an outer surface of a substantially vertical wall structure, wherein the mounting structure includes a longitudinally and horizontally extending fluid conduit; and
   at least one planting unit engaged with and supported by the at least one mounting structure and configured so as to receive fluid from the fluid conduit.

11. The modular wall planting system of claim 10, wherein the at least one planting unit engages a channel within the at least one mounting structure.

12. The modular wall planting system of claim 10, wherein the mounting structure further comprises a nozzle in fluid communication with the conduit, and wherein the nozzle is adapted to provide water to plant matter located within the planting unit.

13. A modular wall mounted agricultural system, comprising:
   a mounting means comprising:
      a first end;
      a second end;
      a fluid conduit extending longitudinally between the first and the second end; and
      at least one longitudinally extending channel; and
   at least one planter box that is adapted to mount within the at least one channel of the mounting structure, and that includes an interior compartment adapted to receive plant matter therein, and a plurality of sidewalls cooperating to form an upwardly opening aperture adapted to receive a fluid from the conduit.

14. The modular wall mounted agricultural system of claim 13, wherein the mounting means includes an elongated mounting structure and wherein the fluid conduit is internal to the mounting structure.

15. A modular wall mounted agricultural system, comprising:
   a mounting structure comprising:
      a first end;
      a second end;
      at least one longitudinally extending channel;
      at least one nozzle extending laterally through at least a portion of the mounting structure; and
   at least one planter box that is adapted to mount within the at least one channel of the mounting structure, and wherein the at least one planter box includes a plurality of sidewalls and a bottom wall that cooperate to form a compartment adapted to receive plant matter therein, the plurality of sidewalls cooperating to form an upwardly opening aperture adapted to receive a fluid from the conduit.

16. The modular wall mounted agricultural system of claim 15, wherein the mounting structure further comprises a fluid conduit extending longitudinally between the first and the second end, and wherein the at least one nozzle is in fluid communication with the fluid conduit.

* * * * *